United States Patent
Hamburg

(10) Patent No.: US 7,499,587 B1
(45) Date of Patent: Mar. 3, 2009

(54) METHOD AND APPARATUS FOR INTERPOLATING COLORS

(75) Inventor: Mark Hamburg, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 470 days.

(21) Appl. No.: 11/142,140

(22) Filed: May 31, 2005

(51) Int. Cl.
G06K 9/00 (2006.01)

(52) U.S. Cl. .................. 382/167; 382/162; 382/166; 382/300; 345/501

(58) Field of Classification Search ............ 382/167
See application file for complete search history.

(56) References Cited

U.S. PATENT DOCUMENTS

| | | | |
|---|---|---|---|
| 4,275,413 A | | 6/1981 | Sakamoto et al. |
| 5,596,510 A | * | 1/1997 | Boenke ............. 358/523 |
| 5,666,436 A | | 9/1997 | Eames |
| 6,208,351 B1 | * | 3/2001 | Borg et al. ......... 345/600 |
| 6,289,364 B1 | * | 9/2001 | Borg et al. ......... 715/209 |
| 6,421,140 B1 | | 7/2002 | Hui |
| 6,421,460 B1 | * | 7/2002 | Hamburg ........... 382/162 |
| 6,731,796 B2 | | 5/2004 | Maltz et al. |

* cited by examiner

*Primary Examiner*—Jingge Wu
*Assistant Examiner*—John W Lee
(74) *Attorney, Agent, or Firm*—Robert C. Kowert; Meyertons, Hood, Kivlin, Kowert & Goetzel, P.C.

(57) ABSTRACT

A system is provided that interpolates between two colors. A color can be represented by a set of components, including an obscuring component that can obscure other components. The system receives first and second colors, and an interpolating parameter specifying an interpolation point between the two colors. The system generates an interpolated color by first computing an obscuring color-component value for the interpolated color by using the interpolating parameter to interpolate between the obscuring color-component value of the first color and the obscuring color-component value of the second color. The system computes a modified interpolating parameter based on the interpolating parameter, the obscuring color-component value of the first color, and the obscuring color-component value of the second color. The system computes other color-component values for the interpolated color by using the modified interpolating parameter to interpolate between the other color component values of the two colors.

21 Claims, 2 Drawing Sheets

METHOD AND APPARATUS FOR INTERPOLATING COLORS

FIELD OF THE INVENTION

The present invention relates to techniques for interpolating colors. More specifically, the present invention relates to a method and an apparatus for interpolating colors in a color space that has an obscuring color component.

BACKGROUND

Related Art

Color interpolation is a fundamental digital image processing operation that is used by many applications. For example, applications often use color interpolation in transparency related operations.

Unfortunately, present techniques for interpolating colors can produce undesirable artifacts in certain situations. For example, linear interpolation, which is a popular color interpolation technique, can produce undesirable artifacts while interpolating between colors in the CMYK (Cyan, Magenta, Yellow, Black) color space. Note that, due to the presence of an obscuring color component (black), dark colors have multiple representations in CMYK that use different mixtures of cyan, magenta, yellow, and black color components. Consequently, linearly interpolating between two colors in CMYK space can lead to undesirable results as different color components come to dominate during interpolation.

Note that these undesirable artifacts are not limited to the CMYK color space. Specifically, present color interpolation techniques can produce undesirable artifacts in any color space that includes an obscuring color component that can obscure other color components.

Hence, what is needed is a method and an apparatus for interpolating between colors without the above-described drawbacks.

SUMMARY

One embodiment of the present invention provides a system that interpolates between two colors: a first color and a second color. In this system, a color can be represented by a set of color components which includes an obscuring color-component that can obscure other color components. For example, the set of color components can include Cyan, Magenta, Yellow, and Black, wherein the obscuring color-component is Black. During operation, the system receives the first color and the second color. Next, the system receives an interpolating parameter which specifies an interpolation point between the first color and the second color. The system then generates an interpolated color by first computing an obscuring color-component value for the interpolated color by using the interpolating parameter to interpolate between the obscuring color-component value of the first color and the obscuring color-component value of the second color. Next, the system computes a modified interpolating parameter based on the interpolating parameter, the obscuring color-component value of the first color, and the obscuring color-component value of the second color. The system then computes other color-component values for the interpolated color by using the modified interpolating parameter to interpolate between the other color component values of the first color and the other color component values of the second color. Note that using the modified interpolating parameter to compute the other color component values generally causes the interpolated color to look more natural, and can also reduce or prevent the occurrence of undesirable artifacts during interpolation.

In a variation on this embodiment, the modified interpolating parameter is the same as the interpolating parameter if and only if the obscuring color-component value for the first color is equal to the obscuring color-component value for the second color.

In a variation on this embodiment, the modified interpolating parameter p is computed using the expression:

$$t \cdot \left( \frac{(1 - B_k) \cdot (1 - e) + e}{(1 - A_k \cdot (1 - t) - B_k \cdot t) \cdot (1 - e) + e} \right),$$

where t is the interpolating parameter, $A_k$ is the obscuring color-component value of the first color, $B_k$ is the obscuring color-component value of the second color, and e is a user defined parameter that can be used to control the difference between p and t.

In a variation on this embodiment, the interpolating parameter can take on values between 0 and 1. Further, the interpolated color is equal to the first color when the interpolating parameter is equal to 0, and the interpolated color is equal to the second color when the interpolating parameter is equal to 1.

In a variation on this embodiment, the system can be used to interpolate between a set of colors that contains more than two colors.

In a variation on this embodiment, the system can be used to generate a smooth transition between two colors that are printed on a surface in proximity to one another.

DETAILED DESCRIPTION

Figure 1A:
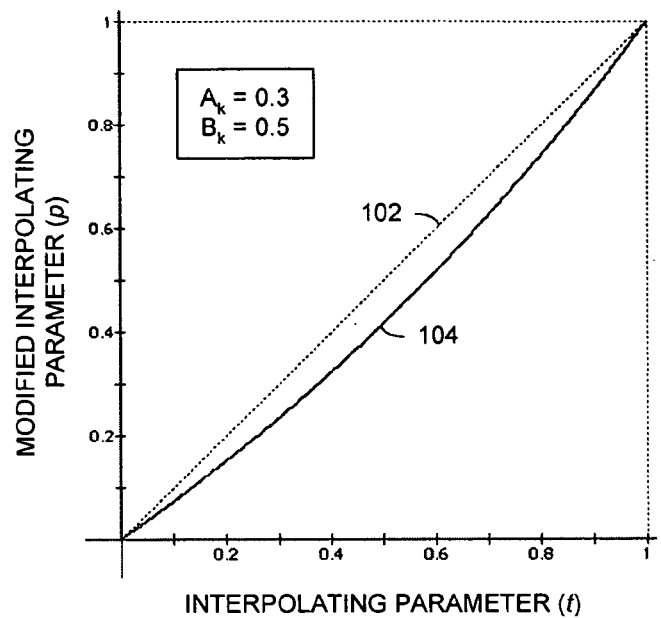
FIGS. 1A and 1B presents a plot of the modified interpolation parameter vs. the interpolation parameter for different values of the black color component in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Color Spaces

A colors space is a set of color components that can be used to generate a gamut (or range) of colors.

For example, television screens and computer monitors generate colors using the RGB (Red, Green, and Blue) color space by combining red, green, and blue light. Note that color spaces used by monitors and other systems that emit light are called additive color spaces because they generate colors by adding light of different colors. Furthermore, note that, although all colors of the visible spectrum can be produced by merging red, green and blue light, monitors are usually capable of displaying only a limited gamut of the visible spectrum.

In contrast, printed paper reflects certain colors and absorbs other colors. Specifically, printing technology typically uses CMYK (Cyan, Magenta, Yellow, and Black) pigments to reflect (or absorb) varying degrees of red, green, and blue components from white light to produce a limited gamut of the visible spectrum. (Note that, in CMYK, the black component is represented using the letter "K" instead of the letter "B". This is done to prevent confusion with the RGB color space in which the letter "B" stands for the blue component.) Such color spaces are usually known as subtractive color spaces because they generate colors by subtracting various color components from white light. Note that the gamut produced by RGB can be different from the gamut produced by CMYK.

Note that CMYK color space is widely used in printing technology. Hence, it is very important to find a good technique for interpolating between colors in the CMYK color space.

Color Interpolation

Typically a color interpolation function takes two colors, A and B, and a parameter t ($0 \leq t \leq 1$) to generate an interpolated color, X. Note that t represents an interpolation point between the two input colors. The interpolation function typically satisfies the following properties: X=A when t=0, and X=B when t=1.

Furthermore, X is usually between colors A and B when t is between 0 and 1. Note that we use the term "between" in a loose sense. Specifically, in one embodiment, "between" can mean that color X lies in the bounding box defined by colors A and B.

Additionally, the interpolation function is usually continuous, which means that X varies smoothly as t moves from 0 to 1. Further, small changes in t typically produce small changes in X.

Note that, as defined above, a color interpolation function operates on two input colors. Usually it is advantageous to be able to extend this function to interpolate between more than two input colors. For example, we can use an interpolation function that takes two input colors to interpolate between three colors—A, B, C—using the following expression: I(I (A, B, t), C, u), where I is the interpolation function, and t and u are the interpolation parameters that determine how to interpolate between the three colors.

Furthermore, depending on the type of interpolation function used, the order in which the colors are interpolated can change the final result. Consequently, it may be beneficial to have an interpolation function that is associative with respect to the order in which the colors are interpolated. This ensures that the final interpolated color is not dependent on the specific order in which the colors are interpolated. Specifically, the above-described interpolation function is associative if it satisfies the following property:

$$I(A, I(B, C, t), u) = I\left(I\left(A, B, \frac{u \cdot (1-t)}{1 - t \cdot u}\right), C, t \cdot u\right).$$

Present interpolation techniques often use linear interpolation to interpolate between colors. It will be obvious to one skilled in the art that linear interpolation satisfies the above-described properties. In linear interpolation, the interpolated color is obtained by linearly interpolating each component of the input colors. Specifically, let $(A_C, A_M, A_Y, A_K)$ and $(B_C, B_M, B_Y, B_K)$ represent the CMYK color component values of input colors A and B, respectively. (Note that, for the sake of brevity, we often use the term "color component" instead of the term "color component value." It will be obvious from the context when the term "color component" means "color component value.") Further, let us assume that each color component can take on values between 0 and 1, i.e., $0 \leq A_C, A_M, A_Y, A_K, B_C, B_M, B_Y, B_K \leq 1$. Additionally, let t be an interpolation parameter between 0 and 1. Then the color components of the interpolated color, X, can be computed using the following expressions:

$X_C = (1-t) \cdot A_C + t \cdot B_C$ $X_M = (1-t) \cdot A_M + t \cdot B_M$ $X_Y = (1-t) \cdot A_Y + t \cdot B_Y$ $X_K = (1-t) \cdot A_K + t \cdot B_K$ Unfortunately, linear interpolation can lead to undesirable artifacts in color spaces such as CMYK which have an obscuring color component such as black. One of the reasons for these artifacts is that CMYK uses 4 color components to represent what can essentially be represented using 3 color components. In particular, due to the presence of the obscuring color component (black), dark colors have multiple representations in CMYK that use different mixtures of black, cyan, magenta, and yellow inks. Consequently, linearly interpolating between two colors in CMYK space can lead to undesirable results as different inks come to dominate during the transition.

For example, consider the interpolation between white and a rich black, i.e., a color that looks black, but has a high value of other color components, such as cyan. Note that as we move away from the rich black, the black component's dominance over the other colors will progressively decrease. Consequently, an interpolated color between these two colors may appear distinctly bluish as the cyan component in the rich black becomes more prominent. This is undesirable because, ideally, we want an interpolated color between a white and a rich black to simply be a shade of gray.

Note that linear interpolation works quite well in RGB space. Hence, transforming from CMYK to RGB might help us to find a solution to the interpolation problem. One embodiment of the present invention uses this insight to find a technique to interpolate between two colors in the CMYK space. Furthermore, this technique can be generalized to a technique that can interpolate between two colors in a color space that includes an obscuring color component.

Furthermore, note that simply transforming between CMYK space and RGB space does not work because it loses the black component information. Hence, a naive application of the CMYK/RGB transformation will not solve the undesirable artifact problem.

A color in CMYK space can be transformed into a color in the RGB space using the following expressions:

$$r = (1-c) \cdot (1-k)$$

$$g = (1-m) \cdot (1-k)$$

$$b = (1-y) \cdot (1-k)$$

where r, g, and b are the red, green, and blue component values, and c, m, y, and k are the cyan, magenta, yellow, and black component values, respectively. (Note that all color component values are between 0 and 1.)

Let $(A_R, A_G, A_B)$, $(B_R, B_G, B_B)$, and $(X_R, X_G, X_B)$ be the RGB color components of colors A, B, and X, respectively, wherein X is an interpolated color between colors A and B that is computed using linear interpolation with parameter t. Specifically, $X_R$ can be computed using the expression:

$$X_R = (1-t) \cdot A_R + t \cdot B_R.$$

Substituting the CMYK/RGB transformation expressions for $A_R$, $B_R$, and $X_R$, we obtain the following expression:

$$(1-X_C) \cdot (1-X_K) = (1-t) \cdot (1-A_C) \cdot (1-A_K) + t \cdot (1-B_C) \cdot (1-B_K).$$

Solving for $X_C$ gives us $X_C = (1-p) \cdot A_C + p \cdot B_C$, where p is given by $$p = t \cdot \frac{1 - B_K}{1 - X_K}.$$

Note that p can e viewed as a modified interpolation parameter that is derived from the black component value of input color B and the black component of the interpolated color X. Further, note that the black component of the interpolated color X can be derived from the black components of the input colors A and B. As a result, the modified interpolation parameter p can be derived from the black components of the input colors A and B.

Note that we may not be able to use the expression $$p = t \cdot \frac{1 - B_K}{1 - X_K}$$

when $B_K$ is equal to 1. This is because when $B_K=1$, p is equal to 0 regardless of the value of t, which is undesirable. It will be apparent to one skilled in the art that a number of techniques can be used to ensure that the expression for p is valid even when $B_K$ is equal to 1. For example, one simple way to fix this problem is to multiply the color components $B_K$ and $X_K$ by a factor (1−e), where e is a user defined parameter between 0 and 1. Adding this tweak to the expression for p give us $$p = t \cdot \frac{1 - (1-e) \cdot B_K}{1 - (1-e) \cdot X_K}.$$

Note that the parameter e can also be used to control the difference between p and t. Specifically, when e=1, p is exactly the same as t, whereas when e=0, the difference between the values of p and t can be substantial. Furthermore, note that, the parameter e can also be used to model situations where the obscuring component might not be perfectly obscuring. For example, 100% black ink might actually only achieve 90% of the desired darkness level and leave 10% of the paper or the other colors on the paper showing through. This situation can be modeled by assigning a value of 0.1 to e.

The intuition behind modifying the interpolation parameter is as follows: the modification ensures that the other components are interpolated in a way that reduces or prevents undesirable artifacts when the dominance of the black component decreases. This intuition is explained further in the following paragraphs.

Figure 1B:
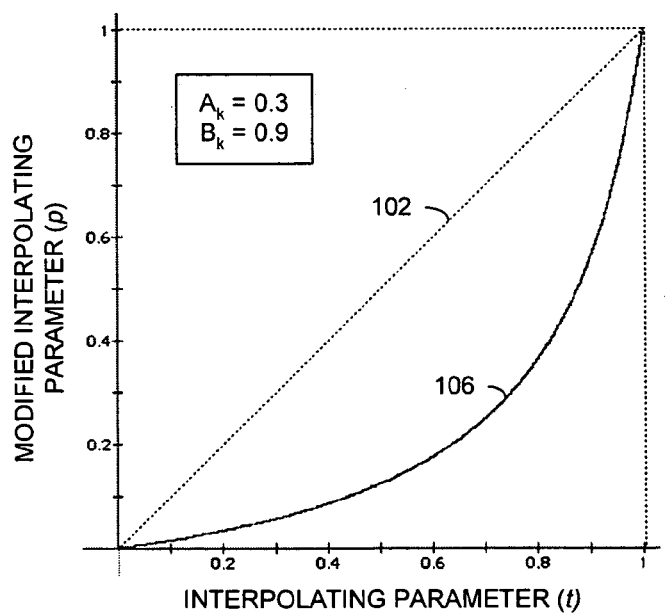

FIG. 1A and 1B presents a plot of the modified interpolation parameter vs. the interpolation parameter for different values of the black color component in accordance with an embodiment of the present invention.

FIG. 1A presents a plot of p vs. t when the black component $(A_K)$ for color A is equal to 0.3 and the black component $(B_K)$ for color B is equal to 0.5. Curve 102 represents the "p=t" curve, and curve 104 represents the $$\text{``} p = t \cdot \frac{1 - B_K}{1 - X_K} \text{''}$$

curve. Note that since the black components of the two input colors are almost the same, the modified interpolation parameter p is almost the same as the interpolation parameter t.

On the other hand, FIG. 1B presents a plot of p vs. t when the black component $(A_K)$ for color A is the same as in FIG. 1A, namely 0.3, but the black component $(B_K)$ for color B is much larger, namely, 0.9. As before, curve 102 represents the "p=t" curve, and curve 106 represents the $$\text{``} p = t \cdot \frac{1 - B_K}{1 - X_K} \text{''}$$

curve. Note that since the black components of the two input colors are different, the modified interpolation parameter p is substantially different from the interpolation parameter t.

Further, FIG. 1B illustrates the reason why using a modified interpolation parameter can reduce or prevent the occurrence of undesirable artifacts during interpolation. Specifically, as curve 106 illustrates, p has a much smaller value than t when t=0.5. Consequently, since the other color components are interpolated based on the value of p instead of t, and since the value of p is much smaller than the value of t, the undesirable artifacts due to these other components are substantially reduced.

For example, let us assume that color B has a strong cyan component in the example illustrated in FIG. 1B. If we had simply used linear interpolation, the strong cyan component would have caused an interpolated color at t=0.5 to look distinctly blue. But, since we use the modified interpolation parameter p instead of the interpolation parameter t to determine the amount of cyan in the interpolated color, and since the value of p is much less than the value of t when t≦0.8, the interpolated color at t=0.5 does not appear bluish. (Note that when the value of t is close to 1, e.g., 0.8≦t≦1, the black component is dominant and hence it doesn't matter if the cyan component also has high value.)

To summarize, one embodiment of the present invention modifies the interpolation parameter based on the obscuring color component values of the input colors. In another embodiment, the system computes the modified interpolation parameter based on an interpolated value of the obscuring color component. The system then uses the modified interpolation parameter to interpolate other color components. By dong this, the system can appropriately suppress the effect of other color components as the obscuring color component decreases in value during interpolation.

Process of Interpolating Between Colors

Figure 2:
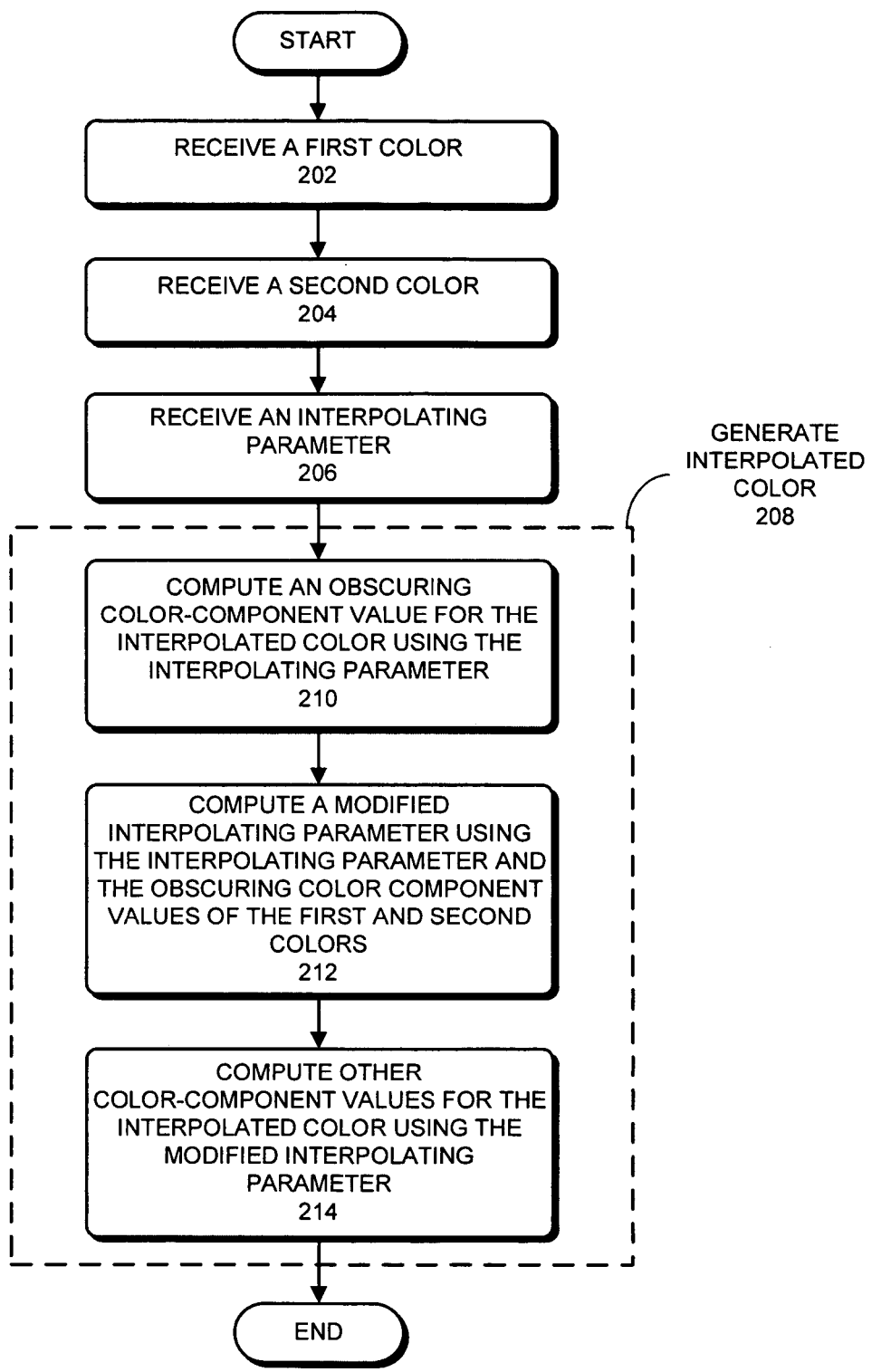
FIG. 2 presents a flowchart that illustrates a process for interpolating between colors in accordance with an embodiment of the present invention.

FIG. 2 presents a flowchart that illustrates a process for interpolating between colors in accordance with an embodiment of the present invention.

The process typically begins by receiving a first color (step 202) and a second color (step 204).

Note that a color is sometimes represented by a set of color components that contains an obscuring color-component which can obscure other color components. Specifically, in one embodiment, the set of color components can include Cyan, Magenta, Yellow, and Black. In this embodiment, the obscuring color component is Black. In one embodiment, all color components have values between 0 and 1.

The system then receives an interpolating parameter which represents an interpolation point between the first color and the second color (step 206).

In one embodiment, the interpolating parameter can take values between 0 and 1. Further, we can require the interpolating process to satisfy the following conditions: the interpolated color should be equal to the first color when the interpolating parameter is equal to 0; and the interpolated color should be equal to the second color when the interpolating parameter is equal to 1. Next, the system generates an interpolated color (step 208).

Specifically, in one embodiment, the system computes an obscuring color-component value for the interpolated color using the interpolating parameter (step 210).

Note that the system can use linear interpolation to compute the obscuring color-component value for the interpolated color.

The system then computes a modified interpolating parameter using the interpolating parameter and the obscuring color-component values of the first and second colors (step 212).

Specifically, in one embodiment, the system computes the modified interpolating parameter using the expression $$t \cdot \left( \frac{(1-B_k) \cdot (1-e) + e}{(1-A_k \cdot (1-t) - B_k \cdot t) \cdot (1-e) + e} \right),$$

where t is the first parameter, $A_k$ is the obscuring color-component value of the first color, $B_k$ is the obscuring color-component value of the second color, and e is a third parameter which can be used to control the difference between p and t.

Next, the system computes other color-component values for the interpolated color using the modified interpolating-parameter (step 214). Note that computing other color-component values for the interpolated color using the modified interpolating-parameter instead of the interpolating parameter causes the interpolated color to look more natural. Further, by doing this, the system can also reduce or prevent the occurrence of undesirable artifacts.

Although the above process was illustrated using two colors, it will be apparent to one skilled in the art that the system can also be used to interpolate between more than two colors. For example, in one embodiment, the system can interpolate between the first color and the second color to obtain a first interpolated color. The system can then interpolate between the first interpolated color and the third color to obtain a second interpolated color. Next, the system can interpolate between the second interpolated color and the fourth color to obtain a third interpolated color, and so on. This iterative interpolation process can be continued till the system interpolates between all the given colors.

Furthermore, note that, when interpolating between multiple colors, the system can interpolate the obscuring components and generate modified interpolation parameters for the remaining color components and then interpolate the remaining color components using the modified interpolation parameters. Specifically, in one embodiment, the system can interpolate between multiple colors that contain multiple color components by recursively using the process described in the instant application.

Furthermore, the foregoing descriptions of embodiments of the present invention have been presented only for purposes of illustration and description. They are not intended to be exhaustive or to limit the present invention to the forms disclosed. Accordingly, many modifications and variations will be readily apparent to practitioners skilled in the art. Additionally, the above disclosure is not intended to limit the present invention. The scope of the present invention is defined by the appended claims.

What is claimed is:

1. A method for interpolating between a first color and a second color, wherein a color can be represented by a set of color components which includes an obscuring color-component that can obscure a second color component, the method comprising:
   receiving a first color;
   receiving a second color;
   receiving a first parameter which specifies an interpolation point between the first color and the second color; and
   generating an interpolated color by:
      computing an obscuring color-component value for the interpolated color using the first parameter;
      computing a second parameter based on the first parameter, the obscuring color-component value of the first color, and the obscuring color-component value of the second color; and
      computing a second color-component value for the interpolated color using the second parameter;
   wherein using the second parameter instead of the first parameter to compute the second color component value can cause the interpolated color to look more natural.

2. The method of claim 1,
   wherein computing the obscuring color-component involves using the first parameter to interpolate between the obscuring color-component value of the first color and the obscuring color-component value of the second color;
   wherein computing the second color-component value involves using the second parameter to interpolate between the second color component value of the first color and the second color component value of the second color.

3. The method of claim 1,
   wherein the set of color components includes Cyan, Magenta, Yellow, and Black;
   wherein the obscuring color-component is Black;
   wherein the first parameter can take on values between 0 and 1;
   wherein the interpolated color is equal to the first color when the first parameter is equal to 0;
   wherein the interpolated color is equal to the second color when the first parameter is equal to 1.

4. The method of claim 1, wherein the second parameter is the same as the first parameter if and only if the obscuring color-component value for the first color is equal to the obscuring color-component value for the second color.

5. The method of claim 1, wherein the second parameter, p, is computed using the expression $$t \cdot \left( \frac{(1-B_k) \cdot (1-e) + e}{(1-A_k \cdot (1-t) - B_k \cdot t) \cdot (1-e) + e} \right),$$

where t is the first parameter, $A_k$ is the obscuring color-component value of the first color, $B_k$ is the obscuring color-component value of the second color, and e is a third parameter that can be used to control the difference between p and t.

6. The method of claim 1,
wherein the first color and the second color are printed on a surface in proximity to one another;
wherein the method is used to generate a smooth transition between the first color and the second color.

7. The method of claim 1, wherein the method can be used to interpolate between a set of colors that contains more than two colors.

8. A computer-readable storage device storing instructions that when executed by a computer cause the computer to perform a method for interpolating between a first color and a second color, wherein a color can be represented by a set of color components which includes an obscuring color-component that can obscure a second color component, the method comprising:
receiving a first color;
receiving a second color;
receiving a first parameter which specifies an interpolation point between the first color and the second color; and
generating an interpolated color by:
computing an obscuring color-component value for the interpolated color using the first parameter;
computing a second parameter based on the first parameter, the obscuring color-component value of the first color, and the obscuring color-component value of the second color; and
computing a second color-component value for the interpolated color using the second parameter;
wherein using the second parameter instead of the first parameter to compute the second color component value can cause the interpolated color to look more natural.

9. The computer-readable storage device of claim 8,
wherein computing the obscuring color-component involves using the first parameter to interpolate between the obscuring color-component value of the first color and the obscuring color-component value of the second color;
wherein computing the second color-component value involves using the second parameter to interpolate between the second color component value of the first color and the second color component value of the second color.

10. The computer-readable storage device of claim 8,
wherein the set of color components includes Cyan, Magenta, Yellow, and Black;
wherein the obscuring color-component is Black;
wherein the first parameter can take on values between 0 and 1;
wherein the interpolated color is equal to the first color when the first parameter is equal to 0;
wherein the interpolated color is equal to the second color when the first parameter is equal to 1.

11. The computer-readable storage device of claim 8, wherein the second parameter is the same as the first parameter if and only if the obscuring color-component value for the first color is equal to the obscuring color-component value for the second color.

12. The computer-readable storage device of claim 8, wherein the second parameter, p, is computed using the expression $$t \cdot \left( \frac{(1-B_k) \cdot (1-e) + e}{(1-A_k \cdot (1-t) - B_k \cdot t) \cdot (1-e) + e} \right),$$

where t is the first parameter, $A_k$ is the obscuring color-component value of the first color, $B_k$ is the obscuring color-component value of the second color, and e is a third parameter that can be used to control the difference between p and t.

13. The computer-readable storage device of claim 8,
wherein the first color and the second color are printed on a surface in proximity to one another;
wherein the method is used to generate a smooth transition between the first color and the second color.

14. The computer-readable storage device of claim 8, wherein the method can be used to interpolate between a set of colors that contains more than two colors.

15. An apparatus for interpolating between a first color and a second color, wherein a color can be represented by a set of color components which includes an obscuring color-component that can obscure other color components, the apparatus comprising:
a first receiving mechanism configured to receive a first color;
a second receiving mechanism configured to receive a second color;
a third receiving mechanism configured to receive a first parameter which specifies an interpolation point between the first color and the second color; and
a color-generating mechanism configured to generate an interpolated color by:
computing an obscuring color-component value for the interpolated color using the first parameter;
computing a second parameter based on the first parameter, the obscuring color-component value of the first color, and the obscuring color-component value of the second color; and
computing a second color-component value for the interpolated color using the second parameter;
wherein using the second parameter instead of the first parameter to compute the second color component value can cause the interpolated color to look more natural.

16. The apparatus of claim 15, wherein the color-generating mechanism is configured to:
use the first parameter to interpolate between the obscuring color-component value of the first color and the obscuring color-component value of the second color; and
use the second parameter to interpolate between the other color component values of the first color and the other color component values of the second color.

17. The apparatus of claim 15,
wherein the set of color components includes Cyan, Magenta, Yellow, and Black;
wherein the obscuring color-component is Black;

wherein the first parameter can take on values between 0 and 1;

wherein the interpolated color is equal to the first color when the first parameter is equal to 0;

wherein the interpolated color is equal to the second color when the first parameter is equal to 1.

18. The apparatus of claim 15, wherein the second parameter is the same as the first parameter if and only if the obscuring color-component value for the first color is equal to the obscuring color-component value for the second color.

19. The apparatus of claim 15, wherein the second parameter, p, is computed using the expression $$t \cdot \left( \frac{(1 - B_k) \cdot (1 - e) + e}{(1 - A_k \cdot (1 - t) - B_k \cdot t) \cdot (1 - e) + e} \right),$$

where t is the first parameter, $A_k$ is the obscuring color-component value of the first color, $B_k$ is the obscuring color-component value of the second color, and e is a third parameter that can be used to control the difference between p and t.

20. The apparatus of claim 15, wherein the first color and the second color are printed on a surface in proximity to one another;

wherein the apparatus is used to generate a smooth transition between the first color and the second color.

21. The apparatus of claim 15, wherein the apparatus can be used to interpolate between a set of colors that contains more than two colors.

* * * * *